(12) United States Patent
Sharma et al.

(10) Patent No.: US 11,888,759 B2
(45) Date of Patent: Jan. 30, 2024

(54) SYSTEM FOR EXECUTING DIGITAL RESOURCE TRANSFER USING TRUSTED COMPUTING

(71) Applicant: BANK OF AMERICA CORPORATION, Charlotte, NC (US)

(72) Inventors: Yash Sharma, Delhi (IN); Vinayak Patwari, Hyderabad (IN); Shailesh M. Kotian, Mumbai (IN)

(73) Assignee: BANK OF AMERICA CORPORATION, Charlotte, NC (US)

(*) Notice: Subject to any disclaimer, the term of this patent is extended or adjusted under 35 U.S.C. 154(b) by 134 days.

(21) Appl. No.: 17/355,323

(22) Filed: Jun. 23, 2021

(65) Prior Publication Data

US 2022/0417171 A1    Dec. 29, 2022

(51) Int. Cl.

| | |
|---|---|
| *H04L 47/783* | (2022.01) |
| *H04L 47/765* | (2022.01) |
| *H04L 9/40* | (2022.01) |
| *H04L 47/70* | (2022.01) |

(52) U.S. Cl.
CPC .......... *H04L 47/783* (2013.01); *H04L 47/765* (2013.01); *H04L 47/821* (2013.01); *H04L 47/828* (2013.01); *H04L 63/12* (2013.01)

(58) Field of Classification Search
CPC ... H04L 47/783; H04L 47/765; H04L 47/821; H04L 47/828; H04L 63/12
See application file for complete search history.

(56) References Cited

U.S. PATENT DOCUMENTS

| | | |
|---|---|---|
| 5,182,705 A | 1/1993 | Barr et al. |
| 5,903,721 A | 5/1999 | Sixtus |
| 5,920,861 A | 7/1999 | Hall et al. |
| 5,960,420 A | 9/1999 | Leymann et al. |
| 6,009,405 A | 12/1999 | Leymann et al. |
| 6,044,352 A | 3/2000 | Deavers |
| 6,052,785 A | 4/2000 | Lin et al. |
| 6,073,109 A | 6/2000 | Flores et al. |
| 6,157,721 A | 12/2000 | Shear et al. |
| 6,205,434 B1 | 3/2001 | Ryan et al. |

(Continued)

*Primary Examiner* — Chris Parry
*Assistant Examiner* — Steven C Nguyen
(74) *Attorney, Agent, or Firm* — Moore & Van Allen PLLC; Anup Shrinivasan Iyer (57) ABSTRACT

Systems, computer program products, and methods are described herein for executing digital resource transfer using trusted computing. The present invention is configured to receive, from a second computing device, an indication that a first computing device has initiated a transfer of a digital resource; determine, using the authentication protocol, that the first computing device is in secure possession of the digital resource; initiate, via the second computing device, a request to receive the digital resource from the first computing device; receive, via the second computing device, an indication that the second computing device has received the digital resource from the first computing device; initiate, via the second computing device, a resource verification protocol on the digital resource; verify, using the resource verification protocol, one or more digital signatures associated with the digital resource; and transmit, via the second computing device, an acknowledgement to the first computing device.

20 Claims, 2 Drawing Sheets

(56) References Cited

U.S. PATENT DOCUMENTS

| | | | |
|---|---|---|---|
| 6,208,973 B1 | 3/2001 | Boyer et al. | |
| 6,237,096 B1 | 5/2001 | Bisbee et al. | |
| 6,243,092 B1 | 6/2001 | Okita et al. | |
| 6,253,323 B1 | 6/2001 | Cox et al. | |
| 6,253,369 B1 | 6/2001 | Cloud et al. | |
| 6,311,272 B1 | 10/2001 | Gressel | |
| 6,314,425 B1 | 11/2001 | Serbinis et al. | |
| 6,324,353 B1 | 11/2001 | Laussermair et al. | |
| 6,327,574 B1 | 12/2001 | Kramer et al. | |
| 2001/0002485 A1 | 5/2001 | Bisbee et al. | |
| 2016/0342986 A1* | 11/2016 | Thomas | G06Q 20/401 |
| 2018/0343126 A1* | 11/2018 | Fallah | H04L 9/3297 |
| 2019/0087792 A1* | 3/2019 | Chow | H04L 63/061 |
| 2019/0281028 A1* | 9/2019 | Gillan | H04L 63/0861 |
| 2020/0142739 A1* | 5/2020 | Chan | G06F 9/50 |
| 2020/0313897 A1* | 10/2020 | Heath | H04L 9/3239 |
| 2021/0021432 A1* | 1/2021 | Atkins | H04L 9/3242 |
| 2021/0152366 A1* | 5/2021 | Wang | H04L 9/0861 |
| 2022/0029831 A1* | 1/2022 | Baek | G16Y 10/75 |
| 2022/0209956 A1* | 6/2022 | Yeh | H04L 9/3239 |
| 2022/0215361 A1* | 7/2022 | Koch | G06F 21/64 |

* cited by examiner

SYSTEM FOR EXECUTING DIGITAL RESOURCE TRANSFER USING TRUSTED COMPUTING

FIELD OF THE INVENTION

The present invention embraces a system for executing digital resource transfer using trusted computing.

BACKGROUND

Almost all types of resource transfers, including digital currency, deposit account money transfer, card transfers, wallet transfer, and/or the like require connectivity with a central ledger system of record that facilitates and authorizes the transfer. There is a need for a system that uses public and private digital signatures to verify the entities historically involved in the transfer of the digital resource from the digital resource itself once it is received by the receiving entity.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for executing digital resource transfer using trusted computing is presented. The system comprising: at least one non-transitory storage device; and at least one processing device coupled to the at least one non-transitory storage device, wherein the at least one processing device is configured to: receive, from a second computing device, an indication that a first computing device has initiated a transfer of a digital resource; initiate, via the second computing device, an authentication protocol on the first computing device and the digital resource in response to receiving the indication; determine, using the authentication protocol, that the first computing device is in secure possession of the digital resource, wherein determining further comprises determining a nonce associated with the digital resource; initiate, via the second computing device, a request to receive the digital resource from the first computing device based on at least determining that the first computing device is in secure possession of the digital resource; receive, via the second computing device, an indication that the second computing device has received the digital resource from the first computing device; initiate, via the second computing device, a resource verification protocol on the digital resource; verify, using the resource verification protocol, one or more digital signatures associated with the digital resource; and transmit, via the second computing device, an acknowledgement to the first computing device that the one or more digital signatures associated with the digital resource has been verified.

In some embodiments, the at least one processing device is further configured to: determine, via the second computing device, that the first computing device has initiated a communication channel to facilitate the transfer of the digital resource.

In some embodiments, the at least one processing device is further configured to: receive, via the second computing device, an indication that the first computing device has erased the digital resource in response to the acknowledgement; and transmit, via the second computing device, control signals to close the communication channel between the first computing device and the second computing device.

In some embodiments, determining that the first computing device is in secure possession of the digital resource further comprises: determining that the first computing device is running a trusted computing environment; and determining that the digital resource has not been compromised since the first computing device obtained possession of the digital resource.

In some embodiments, determining that the digital resource has not been compromised further comprises: determining that one or more data repositories associated with the first computing device has not been compromised; and determining that the digital resource has not been transferred to a third party device prior to being initiated for transfer with the second computing device.

In some embodiments, wherein verifying, using the resource verification protocol, one or more digital signatures associated with the digital resource further comprises: determining that the digital resource has been authenticated by the first computing device by a private digital signature; and determining that the digital resource has been authenticated by an issuing entity by a public digital signature.

In some embodiments, wherein determining that the digital resource has been authenticated by the issuing entity further comprises: determining the nonce associated with the digital resource, wherein the nonce indicates a number of times the digital resource has been transferred from one computing device to another; retrieving the public digital signature associated with the issuing entity from the digital resource based on at least the nonce; and verifying the public digital signature associated with the issuing entity.

In some embodiments, the at least one processing device is further configured to: retrieve a known public digital signature associated with the issuing entity from a data repository of the second computing device; compare the public digital signature with the known public digital signature to determine a match; and verify the public digital signature associated with the issuing entity based on at least determining the match.

In another aspect, a computer program product for executing digital resource transfer using trusted computing is presented. The computer program product comprising a non-transitory computer-readable medium comprising code causing a first apparatus to: receive, from a second computing device, an indication that a first computing device has initiated a transfer of a digital resource; initiate, via the second computing device, an authentication protocol on the first computing device and the digital resource in response to receiving the indication; determine, using the authentication protocol, that the first computing device is in secure possession of the digital resource, wherein determining further comprises determining a nonce associated with the digital resource; initiate, via the second computing device, a request to receive the digital resource from the first computing device based on at least determining that the first computing device is in secure possession of the digital resource; receive, via the second computing device, an indication that the second computing device has received the digital resource from the first computing device; initiate, via the second computing device, a resource verification protocol on the digital resource; verify, using the resource verification protocol, one or more digital signatures associated with the digital resource; and transmit, via the second computing device, an acknowledgement to the first computing device that the one or more digital signatures associated with the digital resource has been verified.

In yet another aspect, a method for executing digital resource transfer using trusted computing is presented. The method comprising: receiving, from a second computing device, an indication that a first computing device has initiated a transfer of a digital resource; initiating, via the second computing device, an authentication protocol on the first computing device and the digital resource in response to receiving the indication; determining, using the authentication protocol, that the first computing device is in secure possession of the digital resource, wherein determining further comprises determining a nonce associated with the digital resource; initiating, via the second computing device, a request to receive the digital resource from the first computing device based on at least determining that the first computing device is in secure possession of the digital resource; receiving, via the second computing device, an indication that the second computing device has received the digital resource from the first computing device; initiating, via the second computing device, a resource verification protocol on the digital resource; verifying, using the resource verification protocol, one or more digital signatures associated with the digital resource; and transmitting, via the second computing device, an acknowledgement to the first computing device that the one or more digital signatures associated with the digital resource has been verified.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, a "resource" or "digital resource" may generally refer to objects, products, devices, goods, commodities, services, and the like, that exist in electronic form and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents in digital form. For purposes of this invention, a resource is typically stored in a resource repository—a storage location where one or more resources are organized, stored and retrieved electronically using a computing device.

As used herein, a "resource transfer," "resource distribution," or "resource allocation" may refer to any transaction, activities or communication between one or more users, one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. In some embodiments, the user may authorize a resource transfer using at least a payment instrument (credit cards, debit cards, checks, digital wallets, currency, loyalty points), and/or payment credentials (account numbers, payment instrument identifiers). Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. In this regard, resource transfers or transactions may refer to the user initiating a purchase for a product, service, or the like from a merchant.

Figure 1:
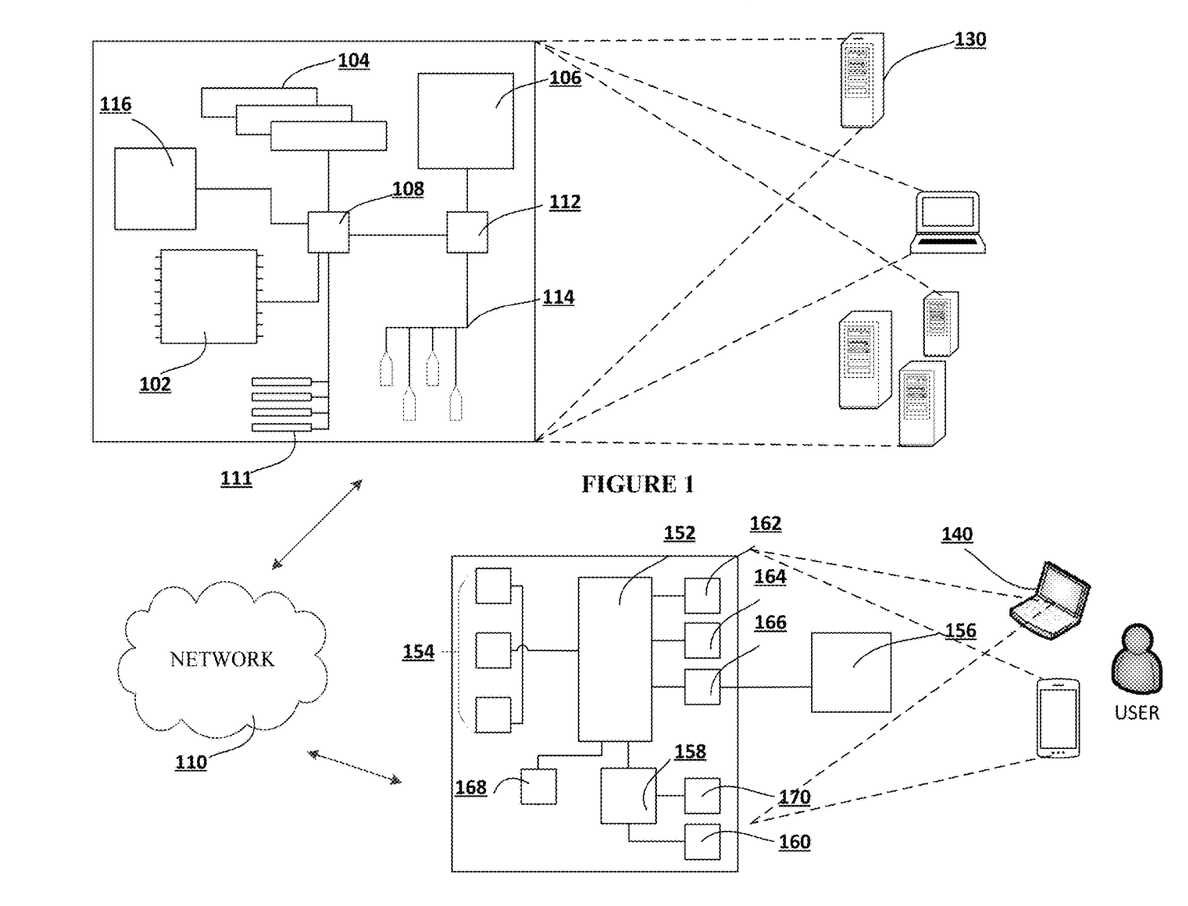
FIG. 1 illustrates technical components of a system for executing digital resource transfer using trusted computing, in accordance with an embodiment of the invention.

FIG. 1 presents an exemplary block diagram of the system environment for executing digital resource transfer using trusted computing 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system(s) 140. In some embodiments, the system 130, and the user input system(s) 140 may be used to implement the processes described herein, in accordance with an embodiment of the present invention. In this regard, the system 130 and/or the user input system(s) 140 may include one or more applications stored thereon that are configured to interact with one another to implement any one or more portions of the various user interfaces and/or process flow described herein.

In accordance with embodiments of the invention, the system 130 is intended to represent various forms of digital computers, such as laptops, desktops, video recorders, audio/video player, radio, workstations, personal digital assistants, servers, wearable devices, Internet-of-things devices, augmented reality (AR) devices, virtual reality (VR) devices, extended reality (XR) devices automated teller machine devices, electronic kiosk devices, blade servers, mainframes, or any combination of the aforementioned. In accordance with embodiments of the invention, the user input system(s) 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the network 110, a number of other computing devices (not shown) in addition to the user input system(s) 140. In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1 also illustrates a user input system(s) 140, in accordance with an embodiment of the invention. The user input system(s) 140 includes a processor 152, memory 154, an input/output device such as a display 156, a communication interface 158, and a transceiver 160, among other components. The user input system(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system(s) 140, including instructions stored in the memory 154. The processor may be implemented as a chipset of chips that include separate and multiple analog and digital processors. The processor may be configured to provide, for example, for coordination of the other components of the user input system(s) 140, such as control of user interfaces, applications run by user input system(s) 140, and wireless communication by user input system(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system(s) 140 with other devices. External interface 168 may provide, for example, for wired communication in some implementations, or for wireless communication in other implementations, and multiple interfaces may also be used.

The memory 154 stores information within the user input system(s) 140. The memory 154 can be implemented as one or more of a computer-readable medium or media, a volatile memory unit or units, or a non-volatile memory unit or units. Expansion memory may also be provided and connected to user input system(s) 140 through an expansion interface (not shown), which may include, for example, a SIMM (Single In Line Memory Module) card interface. Such expansion memory may provide extra storage space for user input system(s) 140 or may also store applications or other information therein. In some embodiments, expansion memory may include instructions to carry out or supplement the processes described above and may include secure information also. For example, expansion memory may be provided as a security module for user input system(s) 140 and may be programmed with instructions that permit secure use of user input system(s) 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer or machine-readable medium, such as the memory 154, expansion memory, memory on processor 152, or a propagated signal that may be received, for example, over transceiver 160 or external interface 168.

In some embodiments, the user may use the user input system(s) 140 to transmit and/or receive information or commands to and from the system 130 via the network 110. Any communication between the system 130 and the user input system(s) 140 (or any other computing devices) may be subject to an authentication protocol allowing the system 130 to maintain security by permitting only authenticated users (or processes) to access the protected resources of the system 130, which may include servers, databases, applications, and/or any of the components described herein. To this end, the system 130 may require the user (or process) to provide authentication credentials to determine whether the user (or process) is eligible to access the protected resources. Once the authentication credentials are validated and the user (or process) is authenticated, the system 130 may provide the user (or process) with permissioned access to the protected resources. Similarly, the user input system(s) 140 (or any other computing devices) may provide the system 130 with permissioned to access the protected resources of the user input system(s) 130 (or any other computing devices), which may include a GPS device, an image capturing component (e.g., camera), a microphone, a speaker, and/or any of the components described herein.

The user input system(s) 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input system(s) 140, which may be used as appropriate by applications running thereon, and in some embodiments, one or more applications operating on the system 130.

The user input system(s) 140 may also communicate audibly using audio codec 162, which may receive spoken information from a user and convert it to usable digital information. Audio codec 162 may likewise generate audible sound for a user, such as through a speaker, e.g., in a handset of user input system(s) 140. Such sound may include sound from voice telephone calls, may include recorded sound (e.g., voice messages, music files, etc.) and may also include sound generated by one or more applications operating on the user input system(s) 140, and in some embodiments, one or more applications operating on the system 130.

In some embodiments, the system 130, and the user input system(s) 140 may be associated with a trusted computing environment that is used to implement the processes described herein, in accordance with an embodiment of the present invention. A trusted computing environment is a secure area of a processor that guarantees code and data loaded inside to be protected with respect to confidentiality and integrity. A trusted computing environment as an isolated execution environment provides security features such as isolated execution, integrity of applications executing with the trusted computing environment, along with confidentiality of their information. In other words, the trusted computing environment offers an execution space that provides a higher level of security for trusted applications running on the device than a rich operating system (OS) and more functionality than a 'secure element' (SE). For purposes of this invention, the system 130 and/or the user input system(s) 140 may include one or more applications stored within the trusted computing environment that are configured to interact with one another to implement any one or more portions of the various user interfaces and/or process flow described herein.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a technical environment that includes a back end component (e.g., as a data server), that includes a middleware component (e.g., an application server), that includes a front end component (e.g., a client computer having a graphical user interface or a Web browser through which a user can interact with an implementation of the systems and techniques described here), or any combination of such back end, middleware, or front end components.

As shown in FIG. 1, the components of the system 130 and the user input system(s) 140 are interconnected using the network 110. The network 110, which may be include one or more separate networks, be a form of digital communication network such as a telecommunication network, a local area network ("LAN"), a wide area network ("WAN"), a global area network ("GAN"), the Internet, or any combination of the foregoing. It will also be understood that the network 110 may be secure and/or unsecure and may also include wireless and/or wired and/or optical interconnection technology.

In accordance with an embodiments of the invention, the components of the system environment 100, such as the system 130 and the user input system(s) 140 may have a client-server relationship, where the user input system(s) 130 makes a service request to the system 130, the system 130 accepts the service request, processes the service request, and returns the requested information to the user input system(s) 140, and vice versa. This relationship of client and server typically arises by virtue of computer programs running on the respective computers and having a client-server relationship to each other.

It will be understood that the embodiment of the system environment 100 illustrated in FIG. 1 is exemplary and that other embodiments may vary. In some embodiments, in some embodiments, the system environment 100 may include more, fewer, or different components. As another example, in some embodiments, some or all of the portions of the system environment 100 may be combined into a single portion. Likewise, in some embodiments, some or all of the portions of the system 130 may be separated into two or more distinct portions.

Almost all types of resource transfers, including digital currency, deposit account money transfer, card transfers, wallet transfer, and/or the like require connectivity with a central ledger system of record that facilitates and authorizes the transfer. The present invention leverages trusted computing environments in devices associated with transferring and receiving entities to authenticate the digital resource directly from the payload itself rather than requiring the need to stay connected to a central system at all times. Accordingly, the present invention uses public and private digital signatures to verify the entities historically involved in the transfer of the digital resource from the digital resource itself once it is received by the receiving entity.

Figure 2:
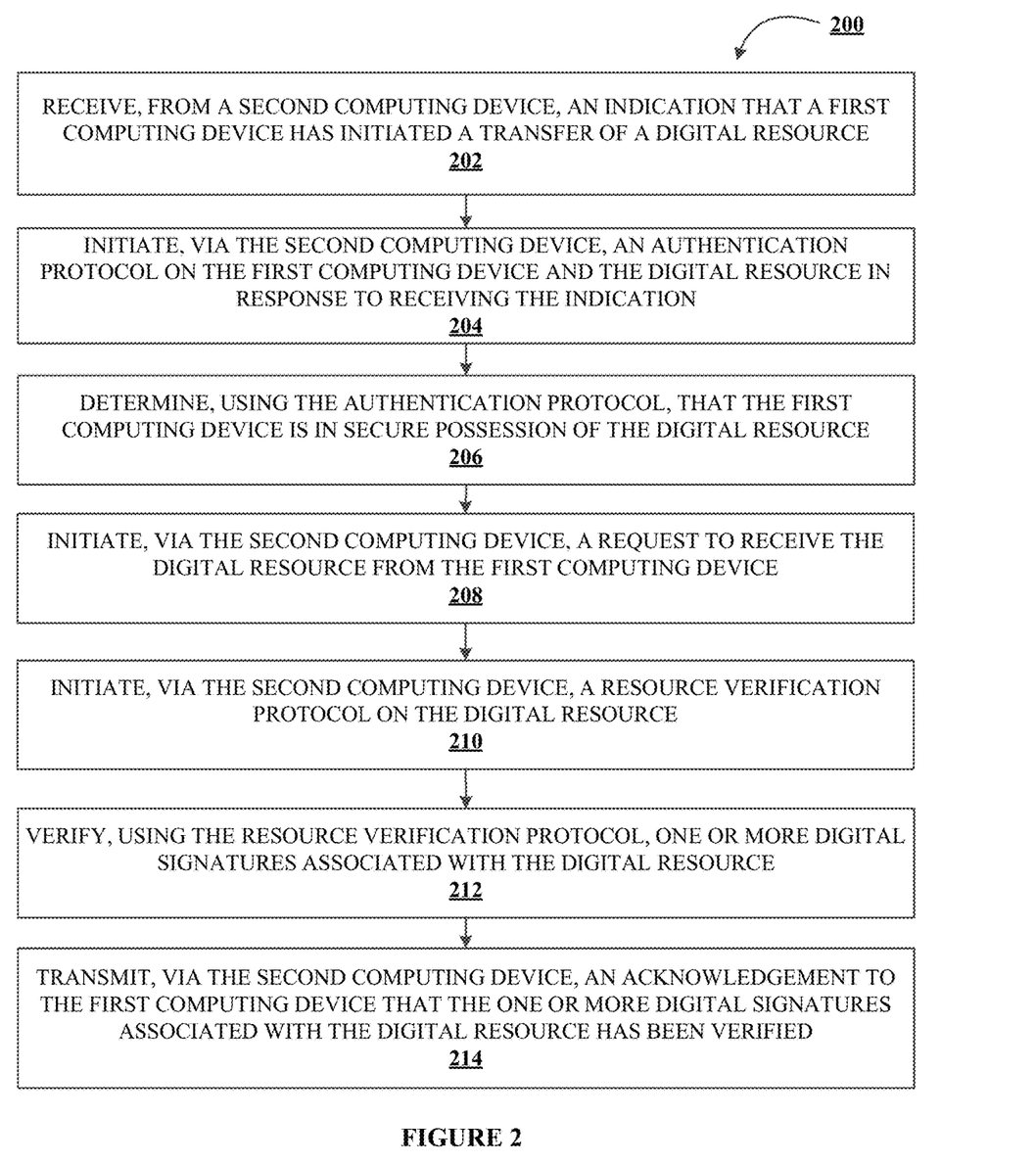
FIG. 2 illustrates a process flow for executing digital resource transfer using trusted computing, in accordance with an embodiment of the invention.

FIG. 2 illustrates a process flow for executing digital resource transfer using trusted computing 200, in accordance with an embodiment of the invention. As shown in block 202, the process flow includes receiving, from a second computing device (e.g., user input system(s) 140), an indication that a first computing device has initiated a transfer of a digital resource. In some embodiments, the indication is received when a first user (associated with the first computing device) wishes to transfer a digital resource to a second user (associated with a second computing device). The digital resource is initially stored in the first computing device of the first user. To transfer the digital resource from the first computing device of the first user to the second computing device of the second user, the first user may initiate, using the first computing device, a communication channel with the second computing device. Accordingly, the system (e.g., system 130) may be configured to determine, via the second computing device, that the first computing device has initiated the communication channel to facilitate the transfer of the digital resource.

In some embodiments, the first user obtains possession of the digital resource from an issuing entity (e.g., a financial institution) in which the first user has a resource repository (e.g., account). The issuing entity authorizes the transfer of the digital resource from the first user's account to the first user by transferring the digital resource from the first user's account to the first computing device. As is typical, the issuing entity may require the first user to provide authentication credentials for authorization purposes prior to transferring the digital resource to the first user. In addition to transferring the digital resource, the issuing entity records a public digital signature with the digital resource as a way to signify the origin of the digital resource.

Next, as shown in block 204, the process flow includes initiating, via the second computing device, an authentication protocol on the first computing device and the digital resource in response to receiving the indication. In some embodiments, the authentication protocol is specifically designed for transfer of resources, i.e., digital resource between the first computing device and the second computing device. It allows the second computing device to authenticate the first computing device as well as authenticate itself to the first computing device by identifying the technical platform (e.g., trusted computing environment), the type of information needed for authentication, as well as the syntax.

Next, as shown in block 206, the process flow includes determining, using the authentication protocol, that the first computing device is in secure possession of the digital resource. In this regard, the system may be configured to determine that the first computing device is running a trusted computing environment. Devices having a trusted computing environment boast secure peripheral access, secure communication with remote entities, and trusted device identity and authentication. Due to the secure nature of trusted computing environments, applications and processes contained within the trusted computing environment are considered trusted applications and processes. Therefore, determining that the first computing device is running a trusted computing environment thereon is an indication that the first computing device is secure.

In addition, the system may be configured to determine that the digital resource has not been compromised since the first computing device obtained possession of the digital resource. As part of this determination, the system may be configured to determine whether the digital resource is stored in within the trusted computing environment in the first computing device. Accordingly, the system may be configured to determine whether one or more data repositories that are used to store the digital resource are secure based on their relationship to the trusted computing environment of the first computing device. If the one or more data repositories operate within the secure rails of the trusted computing environment, the system may be configured to determine that the one or more data repositories associated with the first computing device has not been compromised.

In addition, the system may be configured to determine, via the second computing device, that there are no instances of resource transfers failures recorded with the first computing device with respect to the digital resource. In response to determining that the digital resource has not been compromised and that there are no instances of resource transfers failures recorded with the first computing device, the system may be configured to initiate, via the second computing device, an acknowledgement to the first computing device.

In some embodiments, the system may be configured to determine a nonce associated with the digital resource. Each digital resource may be associated with nonce to identify the number of times the digital resource has been transferred from one device to another. For example, when the issuing entity first transfers the digital resource to the first user, the nonce associated to the digital resource is 1, indicating that the digital resource has been transferred once, i.e., from the issuing entity to the first computing device.

Next, as shown in block 208, the process flow includes initiating, via the second computing device, a request to receive the digital resource from the first computing device based on at least determining that the first computing device is in secure possession of the digital resource. Once it is determined that the digital resource is in secure possession of the first computing device, the second computing device may transmit a request to the first computing device to request the transfer of the digital resource. Next, as shown in block 210, the process flow includes receiving, via the second computing device, an indication that the second computing device has received the digital resource from the first computing device. In response to receiving the request from the second computing device, the first computing device may transfer the digital resource to the second computing device.

Next, as shown in block 212, the process flow includes initiating, via the second computing device, a resource verification protocol on the digital resource. In some embodiments, the resource verification protocol may include a series of pre-configured sub-routines organized to validate the digital resource.

Next, as shown in block 214, the process flow includes verifying, using the resource verification protocol, one or more digital signatures associated with the digital resource. After each transfer, the transferring entity (e.g., the first computing device) records its digital signature on the digital resource and updates the nonce. For example, when the issuing entity first transfers the digital resource to the first computing device, the issuing entity records its public digital signature on the digital resource and updates the nonce to 1. In this way, after each transfer the transferring entity records its digital signature on the digital resource. This allows the receiving entity (e.g., the second computing device) to authenticate current and previous transfers by verifying the digital signature of the entity from whom it is receiving the digital resource. Here, the system may be configured to determine that the first computing device has recorded its private digital signature on the digital resource, thereby authenticating the transfer.

In addition to verifying the digital signature of the transferring entity, the system may be configured to verify the digital signature of the issuing entity that originally issued the digital resource. The digital signature of the issuing entity is a public digital signature that is available to the second computing device receiving the digital resource. To retrieve the digital signature of the issuing entity from the digital resource, the nonce is used as a guide. Each transfer is recorded on the digital resource as a separate encryption layer. Since the nonce indicates the number of times the digital resource has been transferred, the nonce may be used by the system to determine the number of encryption layers to unravel before being able to access the first encryption layer that includes the public digital signature of the issuing entity. In this way, the system may be configured retrieve the public digital signature of the issuing entity. Once retrieved, the system may then be configured to retrieve a known public digital signature associated with the issuing authority from a data repository of the second computing device. In response, the system may be configured to compare the public digital signature with the known public digital signature to determine a match. In response, the system may be configured to verify the public digital signature associated with the issuing authority based on at least determining the match.

Next, as shown in block 216, the process flow includes transmitting, via the second computing device, an acknowledgement to the first computing device that the one or more digital signatures associated with the digital resource has been verified. In some embodiments, the system may be configured to receive, via the second computing device, an indication that the first computing device has erased the digital resource in response to the acknowledgement. In response, the system may be configured to transmit, via the second computing device, control signals to close the communication channel between the first computing device and the second computing device.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for executing digital resource transfer using trusted computing, the system comprising:
   at least one processor; and
   at least one memory operatively coupled to the at least one processor, the at least one memory containing instructions that, when executed by the at least one processor, cause the at least one processor to:
   receive, from a second computing device, an indication that a first computing device has initiated a transfer of a digital resource;
   initiate, via the second computing device, an authentication protocol on the first computing device and the digital resource in response to receiving the indication;
   trigger, using the authentication protocol, a mutual authentication between the first computing device and the second computing device based on at least, (i) the first computing device and the second computing device are running a trusted computing environment, (ii) an authentication information type associated with the first computing environment and the second computing environment, and (iii) a syntax associated with the mutual authentication;
   in an instance in which the first computing device and the second computing device are mutually authenticated, determine, using the authentication protocol, that the first computing device is in secure possession of the digital resource, wherein determining further comprises:
      retrieve information associated with one or more data repositories used to store the digital resource;
      determining that the one or more data repositories operate within one or more secure rails based on at least the information associated with the one or more data repositories indicating that the one or more data repositories are not compromised; and
      determining a nonce associated with the digital resource, wherein the nonce indicates a number of times the digital resource has been transferred from one computing device to another, and wherein the nonce meets a security requirement;
   initiate, via the second computing device, a request to receive the digital resource from the first computing device based on at least determining that the first computing device is in secure possession of the digital resource;
   receive, via the second computing device, an indication that the second computing device has received the digital resource from the first computing device;
   initiate, via the second computing device, a resource verification protocol on the digital resource;

verify, using the resource verification protocol, one or more digital signatures associated with the digital resource, wherein verifying further comprises determining that the digital resource has been authenticated by an issuing entity by a public digital signature, wherein the public digital signature associated with the issuing entity is recorded in a first encryption layer associated with the digital resource; and transmit, via the second computing device, an acknowledgement to the first computing device that the one or more digital signatures associated with the digital resource has been verified.

2. The system of claim 1, wherein the instructions, when executed, further causes the at least one processor to:

determine, via the second computing device, that the first computing device has initiated a communication channel to facilitate the transfer of the digital resource.

3. The system of claim 2, wherein the instructions, when executed, further causes the at least one processor to:

receive, via the second computing device, an indication that the first computing device has erased the digital resource in response to the acknowledgement; and transmit, via the second computing device, control signals to close the communication channel between the first computing device and the second computing device.

4. The system of claim 1, wherein determining that the first computing device is in secure possession of the digital resource further comprises:

determining that the digital resource has not been compromised since the first computing device obtained possession of the digital resource.

5. The system of claim 4, wherein determining that the digital resource has not been compromised further comprises:

determining that one or more data repositories associated with the first computing device has not been compromised; and determining that the digital resource has not been transferred to a third party device prior to being initiated for transfer with the second computing device.

6. The system of claim 1, wherein verifying, using the resource verification protocol, one or more digital signatures associated with the digital resource further comprises:

determining that the digital resource has been authenticated by the first computing device by a private digital signature.

7. The system of claim 6, wherein determining that the digital resource has been authenticated by the issuing entity further comprises:

retrieving the public digital signature associated with the issuing entity from the digital resource based on at least the nonce; and verifying the public digital signature associated with the issuing entity.

8. The system of claim 7, wherein the instructions, when executed, further causes the at least one processor to:

retrieve a known public digital signature associated with the issuing entity from a data repository of the second computing device;

compare the public digital signature with the known public digital signature to determine a match; and verify the public digital signature associated with the issuing entity based on at least determining the match.

9. A computer program product for executing digital resource transfer using trusted computing, the computer program product comprising a non-transitory computer-readable medium comprising code causing a first apparatus to:

receive, from a second computing device, an indication that a first computing device has initiated a transfer of a digital resource;

initiate, via the second computing device, an authentication protocol on the first computing device and the digital resource in response to receiving the indication trigger, using the authentication protocol, a mutual authentication between the first computing device and the second computing device based on at least, (i) the first computing device and the second computing device are running a trusted computing environment, (ii) an authentication information type associated with the first computing environment and the second computing environment, and (iii) a syntax associated with the mutual authentication;

in an instance in which the first computing device and the second computing device are mutually authenticated, determine, using the authentication protocol, that the first computing device is in secure possession of the digital resource, wherein determining further comprises:

retrieving information associated with one or more data repositories used to store the digital resource;

determining that the one or more data repositories operate within one or more secure rails based on at least the information associated with the one or more data repositories indicating that the one or more data repositories are not compromised; and determining a nonce associated with the digital resource, wherein the nonce indicates a number of times the digital resource has been transferred from one computing device to another, and wherein the nonce meets a security requirement;

initiate, via the second computing device, a request to receive the digital resource from the first computing device based on at least determining that the first computing device is in secure possession of the digital resource;

receive, via the second computing device, an indication that the second computing device has received the digital resource from the first computing device;

initiate, via the second computing device, a resource verification protocol on the digital resource;

verify, using the resource verification protocol, one or more digital signatures associated with the digital resource, wherein verifying further comprises determining that the digital resource has been authenticated by an issuing entity by a public digital signature, wherein the public digital signature associated with the issuing entity is recorded in a first encryption layer associated with the digital resource; and transmit, via the second computing device, an acknowledgement to the first computing device that the one or more digital signatures associated with the digital resource has been verified.

10. The computer program product of claim 9, wherein the non-transitory computer-readable medium comprising code causes the first apparatus to:

determine, via the second computing device, that the first computing device has initiated a communication channel to facilitate the transfer of the digital resource.

11. The computer program product of claim 10, wherein the non-transitory computer-readable medium comprising code causes the first apparatus to:

receive, via the second computing device, an indication that the first computing device has erased the digital resource in response to the acknowledgement; and transmit, via the second computing device, control signals to close the communication channel between the first computing device and the second computing device.

12. The computer program product of claim 9, wherein determining that the first computing device is in secure possession of the digital resource further comprises:
determining that the digital resource has not been compromised since the first computing device obtained possession of the digital resource.

13. The computer program product of claim 12, wherein determining that the digital resource has not been compromised further comprises:
determining that one or more data repositories associated with the first computing device has not been compromised; and
determining that the digital resource has not been transferred to a third party device prior to being initiated for transfer with the second computing device.

14. The computer program product of claim 9, wherein verifying, using the resource verification protocol, one or more digital signatures associated with the digital resource further comprises:
determining that the digital resource has been authenticated by the first computing device by a private digital signature.

15. The computer program product of claim 14, wherein determining that the digital resource has been authenticated by the issuing entity further comprises:
retrieving the public digital signature associated with the issuing entity from the digital resource based on at least the nonce; and
verifying the public digital signature associated with the issuing entity.

16. The computer program product of claim 15, wherein the non-transitory computer-readable medium comprising code causes the first apparatus to:
retrieve a known public digital signature associated with the issuing entity from a data repository of the second computing device;
compare the public digital signature with the known public digital signature to determine a match; and
verify the public digital signature associated with the issuing entity based on at least determining the match.

17. A method for executing digital resource transfer using trusted computing, the method comprising:
receiving, from a second computing device, an indication that a first computing device has initiated a transfer of a digital resource;
initiating, via the second computing device, an authentication protocol on the first computing device and the digital resource in response to receiving the indication
triggering, using the authentication protocol, a mutual authentication between the first computing device and the second computing device based on at least, (i) the first computing device and the second computing device are running a trusted computing environment, (ii) an authentication information type associated with the first computing environment and the second computing environment, and (iii) a syntax associated with the mutual authentication;
in an instance in which the first computing device and the second computing device are mutually authenticated, determining, using the authentication protocol, that the first computing device is in secure possession of the digital resource, wherein determining further comprises:
retrieving information associated with one or more data repositories used to store the digital resource;
determining that the one or more data repositories operate within one or more secure rails based on at least the information associated with the one or more data repositories indicating that the one or more data repositories are not compromised; and
determining a nonce associated with the digital resource, wherein the nonce indicates a number of times the digital resource has been transferred from one computing device to another, and wherein the nonce meets a security requirement;
initiating, via the second computing device, a request to receive the digital resource from the first computing device based on at least determining that the first computing device is in secure possession of the digital resource;
receiving, via the second computing device, an indication that the second computing device has received the digital resource from the first computing device;
initiating, via the second computing device, a resource verification protocol on the digital resource;
verifying, using the resource verification protocol, one or more digital signatures associated with the digital resource, wherein verifying further comprises determining that the digital resource has been authenticated by an issuing entity by a public digital signature, wherein the public digital signature associated with the issuing entity is recorded in a first encryption layer associated with the digital resource; and
transmitting, via the second computing device, an acknowledgement to the first computing device that the one or more digital signatures associated with the digital resource has been verified.

18. The method of claim 17, wherein the method further comprises:
determining, via the second computing device, that the first computing device has initiated a communication channel to facilitate the transfer of the digital resource.

19. The method of claim 18, wherein the method further comprises:
receiving, via the second computing device, an indication that the first computing device has erased the digital resource in response to the acknowledgement; and
transmitting, via the second computing device, control signals to close the communication channel between the first computing device and the second computing device.

20. The method of claim 17, wherein determining that the first computing device is in secure possession of the digital resource further comprises:
determining that the digital resource has not been compromised since the first computing device obtained possession of the digital resource.

\* \* \* \* \*